Figures 1, 2:
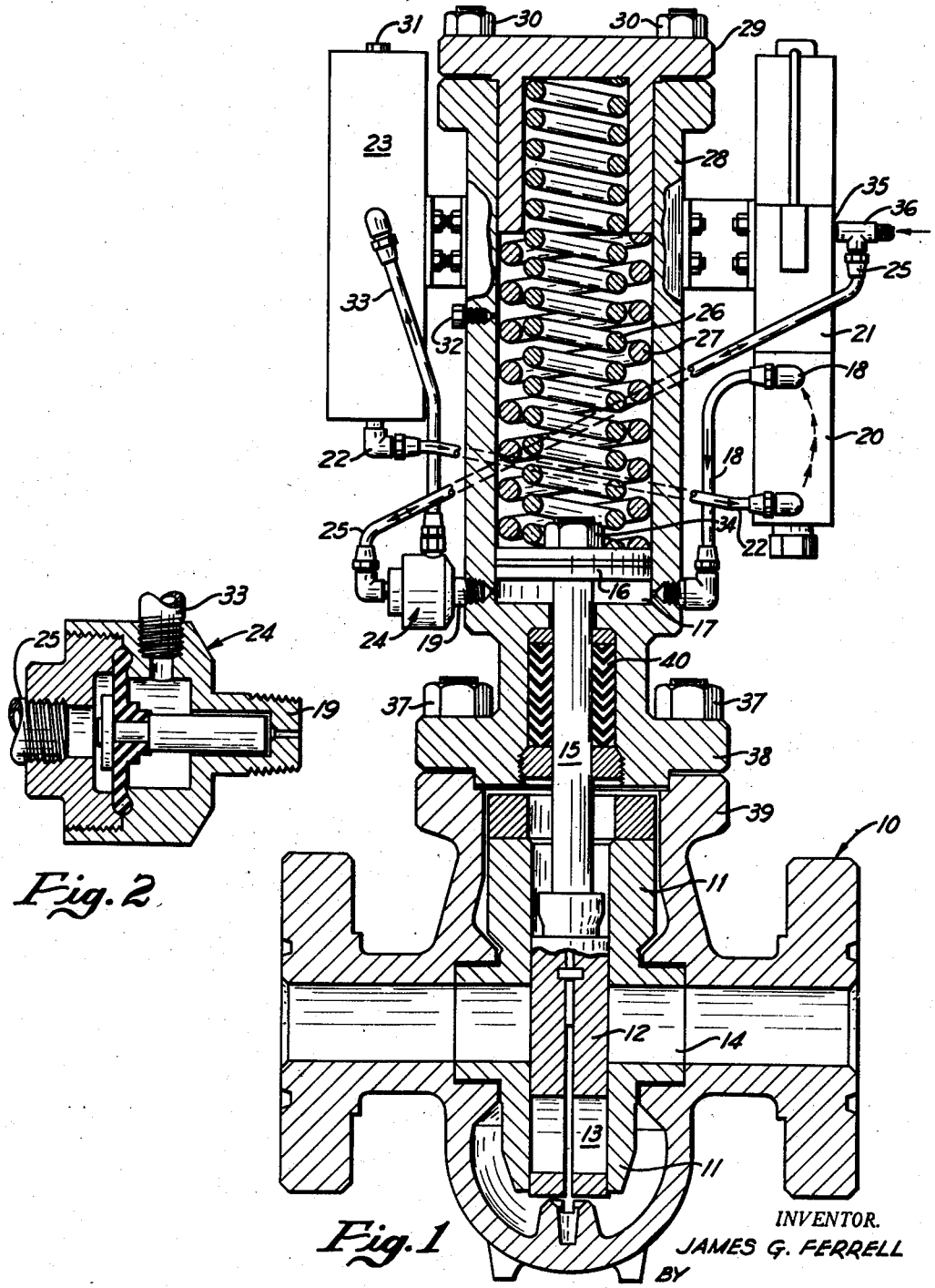

INVENTOR.
JAMES G. FERRELL
BY
HIS ATTORNEY

2,859,010

ACTUATOR FOR GATE VALVE

James G. Ferrell, Houston, Tex., assignor to Gulf Oil Corporation, Pittsburgh, Pa., a corporation of Pennsylvania Application May 18, 1955, Serial No. 509,138

5 Claims. (Cl. 251—28)

My invention relates to a method of operating a gate valve by a combination of pneumatic and hydraulic forces in which pneumatic pressure provides the pilot impulse to set the motor in operation, constitutes the means of propulsion for the motor which operates the pump to provide hydraulic pressure for operation of the valve movement, and simultaneously provides the pressure to close and retain in closed position the escape valve in the hydraulic system.

In oil and gas producing operations it is often desirable to place automatic and remotely controlled shut-offs in the piping complex or "Christmas tree" of the well. My invention provides a full-opening, normally-closed valve operated by low pressure gas which is often available from a separator at the well or which can easily be procured in the form of bottled gas. It is possible to open and close my valve from remote locations either by manual controls or automatically by any standard electrical or mechanical pilot which can be adapted to supply low pressure compressed air or gas to and bleed it from the valve according to a predetermined control function such as high and low pressure limits in a flow line or fluid-level limits in a pressure vessel or tank.

These control functions have been achieved by well-known diaphragm-controlled types of valves, but such valves do not provide a full-opening, through-conduit type of body and cannot be used in the piping and manifold complex, the so called "Christmas tree" of oil or gas wells, or in many flow lines and manifolds.

Other known types of valves have low pressure control but require a high pressure gas supply or dependable electric power to actuate the valve mechanism. Other currently-available valves provide the desired type of valve body and will close automatically, but these must be opened manually and cannot be adapted to automatic and remotely-controlled operations.

Valve actuators are known which embody the principles of pneumatics and hydraulics similar to those used in the present invention, but the heretofore known devices have involved elaborate installations of equipment including massive pumps, tanks, cylinders, pilots and controls. My invention provides a valve actuator with all of the desirable features of full-opening valve body and automatic control, and which can be operated by low pressure gas which is or can be made readily available at oil and gas production installations. The apparatus of my invention is compact and self-contained and is made of components which are readily available.

My invention is illustrated in the drawing accompanying this specification and forming a part thereof, and in which Figure 1 is a view of the valve gate, piston and springs in longitudinal section with the remaining component elements shown diagramatically.

Figure 2 is a section of the escape valve.

Referring to the drawing, the gate valve (shown in closed position) is designated generally by the numeral 10, the valve seat is indicated by the numeral 11, with a valving element 12 forming a longitudinally sliding fit within the seat 11, and containing a gate aperture 13 designed to coincide with aperture 14 in valve seat 11 when the valve is in open position. Attached to one end of the valving element 12 is a rod 15 which connects with piston 16 beneath which piston there is an annular space 17 comprising a hydraulic pressure chamber with inlet line 18 and outlet line 19. Rod 15 is inserted through piston 16 and fastened by a nut 34, which also serves to position springs 26 and 27 within cylinder 28. Rod 15 penetrates annular space 17, through the lower end of cylinder 28, to connect with piston 16. It is in the annular shaped hydraulic pressure chamber 17 that a very high hydraulic pressure is built up and a packing gland around rod 15 as at 40 is employed to retain fluid pressure. Line 18 is connected to pump 20 and pump 20 is powered by motor 21. Pump 20 draws its supply of hydraulic fluid through line 22 from the hydraulic liquid supply reservoir 23. Pressurized gas is supplied to connection 36 from an external source (not shown) and is supplied through T-joint 36 to motor 21 via pipe 35 and also to escape valve 24 via line 25. Springs 26 and 27 are positioned within cylinder 28 and capped by cylinder head 29 which is fastened in place by head bolts and nuts 30. Bleeder line 33 feeds hydraulic fluid back into the reservoir 23 from escape valve 24 when the gas pressure in line 25 is cut off, opening valve 24 so that it bleeds off fluid pressure from the hydraulic pressure chamber 17 beneath piston 16. Breather caps are installed on the hydraulic oil reservoir 23 at 31 and on cylinder 28 at 32 to relieve pressure when the quantity of fluid in the reservoir or the cubic content of air within cylinder 28 varies with the functioning of the piston and valve. Cylinder 28 is formed with shoulders 38 at its lower end which abut shoulders 39 on the gate valve 10. Bolts 37 inserted through shoulders 38 and 39 fasten valve 10 and actuator cylinder 28 securely together.

In the operation of my invention low pressure gas is supplied to the apparatus through T-joint 36 and lines 25 and 35. The introduction of the gas through lines 25 and 35 performs two functions simultaneously. The pressure of gas in line 25 closes escape valve 24 against the passage of hydraulic fluid from the hydraulic pressure chamber 17 through line 19, valve 24 and line 33 to reservoir 23. Valve 24 is a high-ratio, diaphragm-type escape valve so that low pressure is sufficient to hold the valve against hydraulic pressure up to the maximum necessary for operation of the mechanism of the invention, the diaphragm being so mounted that in its natural, unflexed condition the escape valve is held in its open position. Also, powered by the introduction of the low pressure gas through T-joint 36 and line 35, motor 21 is started and operated. Motor 21 drives pump 20 connected thereto which draws hydraulic fluid from reservoir 23 by means of line 22 and pumps it through line 18 into the hydraulic pressure chamber 17. When the pump provides sufficient fluid pressure in the pressure chamber 17 to overcome the pressure of springs 26 and 27, piston 16 will rise carrying with it connecting rod 15 and valving element 12 until aperture 13 in the valving element is in register with opening 14 of valve seat 11, permitting unrestricted flow therethrough. After the piston has been raised to its upper limit the motor 21 stalls out, leaving the valving element up. The valve remains open so long as the gas pressure is maintained through the T-joint 36, to maintain pressure on escape valve 24 through line 25.

Upon cessation of the gas supply through T-joint 36 and lines 25 and 35 the motor 21 and pump 20 will, if they have not already done so, cease operation and concurrently the pressure on valve 24 through line 25 will be released, permitting hydraulic fluid which is under high pressure in the hydraulic pressure chamber 17 below piston 16 to bleed off by way of line 19 through escape valve 24 thence through line 33 back to the hydraulic liquid supply reservoir 23. With the release of hydraulic pressure from hydraulic pressure chamber 17 springs 26 and 27 return piston 16 downward carrying with it connecting rod 15 and valving element 12, thereby moving aperture 13 of said valving element 12 out of register with opening 14 in valve seat 11 and closing the valve to fluid flow.

By way of example, an embodiment of my invention may comprise the following elements. The valve (10) is a 2" series 900 SWP gate valve, without the bonnet, and casing (28) consists of a 4" I. D. cylinder designed for a maximum of 2000 p. s. i. Piston (16) is 4" in diameter and consists of rubber compressed between metal. Motor (21) used is a 2" air motor, and pump (20) is a 2", 60/1 ratio between input gas pressure and pump output, fluid pump. The springs used are 2¾" O. D. x 11.70" long x 9/16" dia. steel spring of 2550 lb. capacity loading, and 4" O. D. x 7.92" long x ⅝" dia. steel spring of 2550 lb. capacity loading when fully compressed. These springs are designed for a pressure of 2000 p. s. i. or less, in the valved flow line. For higher pressures larger springs and piston are required. The pump compresses oil from the reservoir to 1200 p. s. i. to raise the piston against the pressure of the springs. The oil reservoir used is a section of 2½" pipe and the escape valve (24) is a 60/1 ratio, diaphragm escape valve. Packing for the gland 40 which has proved most feasible is of the chevron type as shown in the drawing. Overall size of the installation is about 32½" x 13".

It will be apparent that modifications and variations may be made in the above-described methods and structural elements without departing from the scope and spirit of the present invention. Therefore only such limitations should be imposed as are indicated in the appended claims.

What I claim as my invention is:

1. A fluid control system comprising a gas pressure-actuated motor, a hydraulic pump connected to and driven by said motor, a hydraulic liquid supply reservoir connected to the input of said pump, a spring-opposed piston within a cylinder, means connecting the output of said pump with said cylinder on the end thereof opposite said spring, an escape valve connected to said cylinder on the end thereof opposite said spring, means yieldably urging said escape valve toward open position, means connecting said escape valve with said reservoir, said yieldable means of said escape valve being responsive to gas pressure for closing said escape valve, and a common means for simultaneously supplying pressurized gas to both said motor and said means for closing said escape valve.

2. In a valve and actuating means therefor, the combination comprising a valve including a full-opening valving element within said valve, a spring-opposed, hydraulically-actuated piston within a cylinder, means operatively connecting said piston and said valving element, a fluid control system comprising a gas-pressure-actuated motor, a hydraulic pump connected to and driven by said motor, a hydraulic liquid supply reservoir connected to the input of said pump, means connecting the output of said pump with said hydraulically actuated piston cylinder on the end thereof opposite said spring, an escape valve connected to said piston cylinder on the end thereof opposite said spring, means yieldably urging said escape valve toward open position, means connecting said escape valve with said hydraulic liquid supply reservoir, said yieldable means of said escape valve being responsive to gas pressure for closing said escape valve, and a common means for simultaneously supplying pressurized gas to both said motor and said means for closing said escape valve.

3. In a valve and actuating means therefor, the combination comprising a valve including a full-opening, reciprocable valving element within said valve, a hydraulically actuated piston within a cylinder, means operatively connecting said piston and said valving element, spring means yieldingly urging said piston in a direction to move said valving element operatively connected thereto toward closed position, a fluid control system comprising a gas-pressure-actuated motor, a hydraulic pump connected to and driven by said motor, a hydraulic liquid supply reservoir connected to the input of said pump, means connecting the output of said pump with said hydraulically actuated piston cylinder on the end thereof opposite said spring, an escape valve connected to said piston cylinder on the end thereof opposite said spring, means yieldably urging said escape valve toward open position, means connecting said escape valve with said hydraulic liquid supply reservoir, said yieldable means of said escape valve being responsive to gas pressure for closing said escape valve, and a common means for simultaneously supplying pressurized gas to both said motor and said means for closing said escape valve.

4. In a valve and actuating means therefor the combination comprising a valve including a full-opening, normally-closed reciprocable valving element within said valve, a hydraulically actuated piston within a cylinder, means operatively connecting said piston and said valving element, spring means yieldingly urging said piston in a direction to move said operatively connected valving element toward closed position, a fluid control system comprising a gas-pressure-actuated motor, a hydraulic pump connected to and driven by said motor, a hydraulic liquid supply reservoir connected to the input of said pump, means connecting the output of said pump with a hydraulic pressure chamber within said cylinder for actuating said piston therein, said hydraulic pressure urging said piston in a direction to move said valving element operatively connected thereto toward open position, an escape valve connected to said hydraulic pressure chamber actuating said piston on the end thereof opposite said spring, means yieldably urging said escape valve toward open position, means connecting said escape valve with said hydraulic liquid supply reservoir, said yieldable means of said escape valve being responsive to gas pressure for closing said escape valve, and a common means for simultaneously supplying pressurized gas both to said motor and to said means for closing said escape valve, whereby said spring means and the hydraulic pressure supplied by said pump operate alternately to move said piston and said valving element operatively attached thereto reciprocally, responsive to said supply of pressurized gas, thereby respectively closing and opening said valve.

5. In a valve and actuating means therefor the combination comprising a valve including a normally closed, full-opening, reciprocable valving element within said valve, a fluid control system comprising a gas-pressure-actuated motor, a hydraulic pump connected to and driven by said motor, a hydraulically actuated piston within a cylinder, means operatively connecting said piston and said valving element, spring means yieldingly urging said piston in a direction to place said operatively connected valving element in closed position, a hydraulic pressure chamber within said cylinder for urging said piston in a direction to place said operatively connected valving element in open position, a hydraulic liquid supply reservoir connected to the input of said pump, means connecting the output of said pump with said hydraulic pressure chamber, a flow line connecting said hydraulic pressure chamber with said hydraulic liquid supply reservoir, said flow line having an escape valve therein, means yieldably urging said escape valve toward open position, said yieldable means of said escape valve being responsive to gas pressure for closing said escape valve and a common means for simultaneously supplying pressurized gas to said motor and to said means for closing said escape valve, whereby said escape valve is closed and said valving element is moved from closed to open position only during such time as pressurized gas is supplied to both said gas-pressure-actuated motor and said means for closing said escape valve.

References Cited in the file of this patent

UNITED STATES PATENTS

| | | |
|---|---|---|
| 1,284,662 | Halliwell | Nov. 12, 1918 |
| 1,743,367 | Maybach | Jan. 14, 1930 |
| 2,417,353 | Crane | Mar. 11, 1947 |
| 2,573,993 | Sedgwich | Nov. 6, 1951 |
| 2,661,766 | Adams | Dec. 8, 1953 |
| 2,664,107 | Spengler | Dec. 29, 1953 |